Feb. 1, 1938.    J. FIEUX    2,106,998
TACHYMETRIC CORRECTING DEVICE, MORE PARTICULARLY FOR USE
IN CONNECTION WITH SIGHTING APPARATUS FOR ARTILLERY
Filed Feb. 14, 1936    4 Sheets-Sheet 1
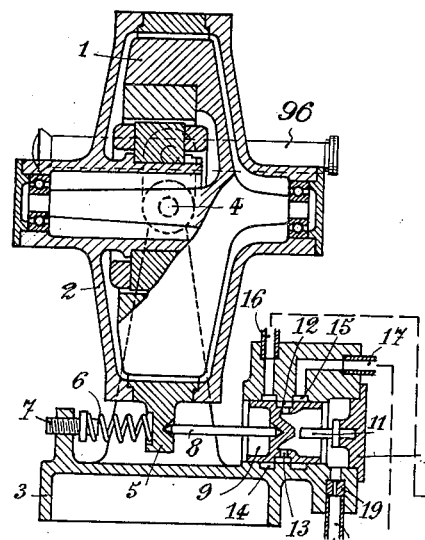
Fig. 1.
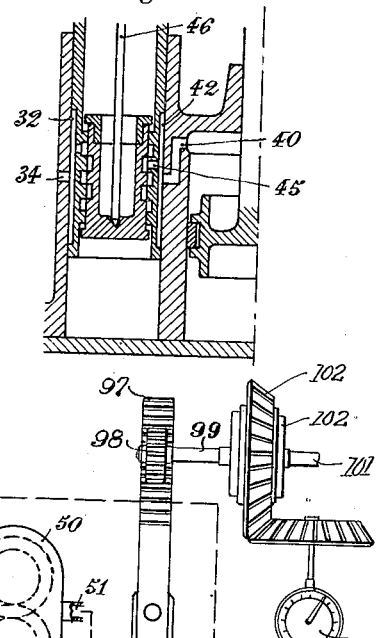
Fig. 2.
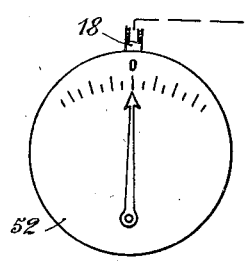
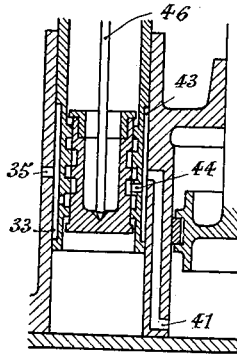
Fig. 3.
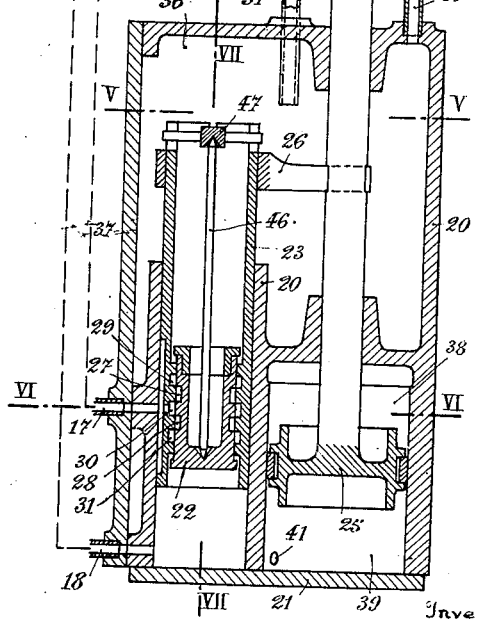
Inventor.
Jean Fieux
By Cameron, Kerkam & Sutton
Attorneys Feb. 1, 1938.   J. FIEUX   2,106,998
TACHYMETRIC CORRECTING DEVICE, MORE PARTICULARLY FOR USE
IN CONNECTION WITH SIGHTING APPARATUS FOR ARTILLERY
Filed Feb. 14, 1936   4 Sheets-Sheet 2
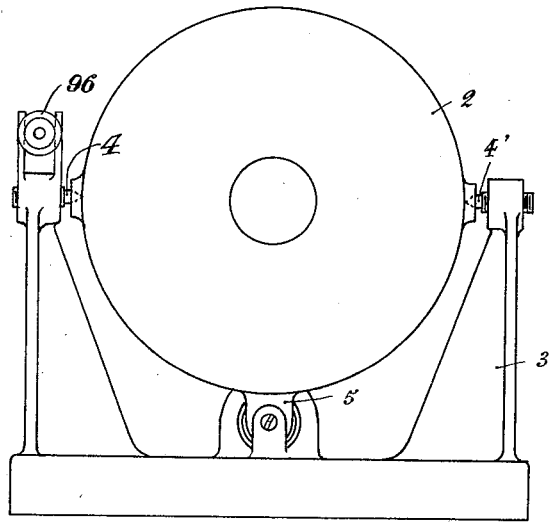
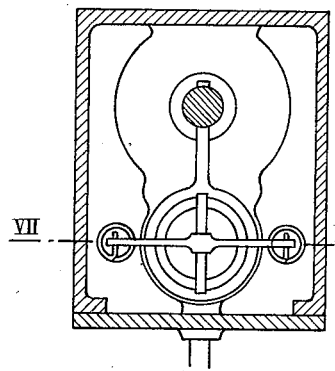  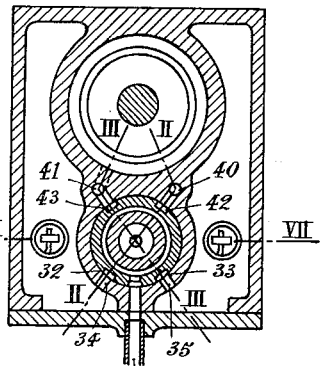
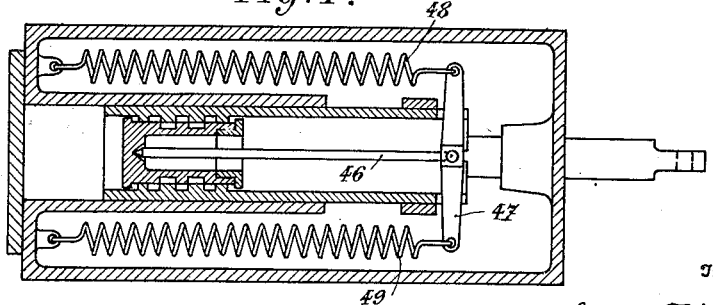
Inventor
Jean Fieux
By
Cameron, Kerkam + Sutton
Attorneys Inventor
Jean Fieux
By
Cameron, Kerkam + Sutton
Attorneys Feb. 1, 1938.  J. FIEUX  2,106,998
TACHYMETRIC CORRECTING DEVICE, MORE PARTICULARLY FOR USE
IN CONNECTION WITH SIGHTING APPARATUS FOR ARTILLERY
Filed Feb. 14, 1936  4 Sheets-Sheet 4

Inventor
Jean Fieux
By
Cameron, Kerkam + Sutton
Attorneys

Patented Feb. 1, 1938

2,106,998

UNITED STATES PATENT OFFICE 2,106,998

TACHYMETRIC CORRECTING DEVICE, MORE PARTICULARLY FOR USE IN CONNECTION WITH SIGHTING APPARATUS FOR ARTILLERY

Jean Fieux, Paris, France, assignor of one-half to Schneider & Cie, Paris, France, a joint-stock company of France Application February 14, 1936, Serial No. 63,934
In France April 4, 1935

14 Claims. (Cl. 89—41)

It is known that correcting devices are available intended more particularly for receiving the variable data for firing at a moving objective such as an aircraft. The use of these devices, however, introduces into a fire control system a very considerable complication, not only from the point of view of their construction and manufacture but also and above all due to the fact of the numerous personnel which they require for their superintendence or manipulation. As a rule, these known devices necessitate attendants who receive, by the indications transmitted to them, the data of the corrections to be worked out, and who introduce the data thus furnished into the complicated mechanism intended for working out the final correction, which may be the sum or the product or both the sum and the product of a certain number of elementary data. The correction-combining device is in a manner a calculating machine which only works out the corrections by the intervention of a relatively large number of attendants constantly engaged in bringing the members of the device as a whole into positions corresponding to the variations of the firing data or in maintaining the said members in those positions.

Among the corrections which it is indispensable to take into consideration, there is above all the correction resulting from a variable angular velocity which is taken into consideration outside the correcting device proper by the variations in position impressed by a gunner upon a sighting device with which he follows the evolutions of the objective.

While involving, of course, a device which may be termed an "angular tachymetric" device, that is, one requiring the intervention of an attendant or pilot for keeping a sighting device directed on the objective, the invention, apart from the said control between the said observer and the objective, practically only comprises mechanical means which render the whole of the correction combining device automatic in the true sense and dispense with the considerable number of attendants required by the devices known heretofore.

Of course, the considerable simplification provided by the invention in effecting a final correction essentially relates to the tachymetric corrections which are preponderant and are practically the only corrections to be considered in certain cases in firing at aircraft and more particularly in firing from one aircraft at an enemy aircraft.

There is nothing to prevent the conception of the combination of this correcting device with additional correcting means for receiving and transmitting corrections such as those for the wind or drift, necessitated for example by firing from a gun mounted on the ground or on board a ship.

According to the invention, this result is obtained by the mechanical connection of the device for the continuous observation of the movable objective, the sighting telescope for example, and a gyroscope, the variations in position impressed upon the said gyroscope being transmitted to a very sensitive intermediate device, such as a pressure-reducing device for fluid, acting in its turn upon a receiving servo-motor connected to the member the position of which is finally to be corrected, such as a gun laying indicator or even the gun itself. There is thus provided a practically direct connection between the member to be moved by an observer and the member whose position is to be corrected, due to the interposition of a gyroscopic device and a transmission by a fluid, the pressure of which is at any instant a function of the reaction of the said gyroscopic device.

Practically, the simplified tachymetric correcting device comprises a servo-motor for receiving the corrections the latter being transmitted by a fluid subjected to a pressure undergoing variations which are a function of the total tachymetric correction, the said variations being themselves impressed upon one of the faces of the movable member of a pressure-reducing device, by the casing of a gyroscope connected to the telescope, the said pressures being at any instant equilibrated on the opposite face of the said movable member, so that the movement of the piston or other movable member of the servo-motor received from an appropriate distributor is a function of the equilibrating pressure.

This simple device wherein the variations in position of the telescope are finally expressed as a variable thrust of the casing of the gyroscope on one of the faces of a member, the opposite face whereof is subjected at any instant to a reaction equal and opposite to that of the thrust, creates in a manner a static transmission system for a variable energy as a function of the variation in position of the telescope.

To simplify the description, the pressure-reducing device which is subjected to gyroscopic reactions will be termed "transmitter", while the whole of the servo-motor and its distributor sensitive to the variable equilibrating pressure emanating from the transmitter, will be termed the "receiver".

In practice, the pressure-reducing and equilibrating device will on its external face be subjected to the action of a spring, of adjustable force, acting on the equilibrating device preferably through the medium of the casing of the gyroscope.

A description of different transmitters and a receiver employing the means according to the invention is given hereinafter by way of example.

A first form of construction is shown in Figures 1 to 7, inclusive, of the accompanying drawings.

Figure 1 shows in sectional elevation a transmitter acted upon by the angular velocity impressed upon the suspension frame of a gyroscope which frame is also operatively connected to a target observing telescope in such a manner as to move therewith in azimuth. The same figure also shows in axial section an appropriate receiver the movable member of which is adapted for connection to the member whose position is to be corrected. It likewise shows the diagram of the pipe lines connecting the transmitter to the receiver.

Figures 2 and 3 are respectively partial sections of the receiver along the lines II—II and III—III in Figure 6.

Figure 4 is an external view of the transmitter shown in section in Figure 1.

Figures 5 and 6, respectively, cross-sections of the receiver along the lines V—V and VI—VI in Figure 1.

Figure 7 is a longitudinal section of the servomotor along the line VII—VII in Figures 1, 5, and 6.

Figure 8:
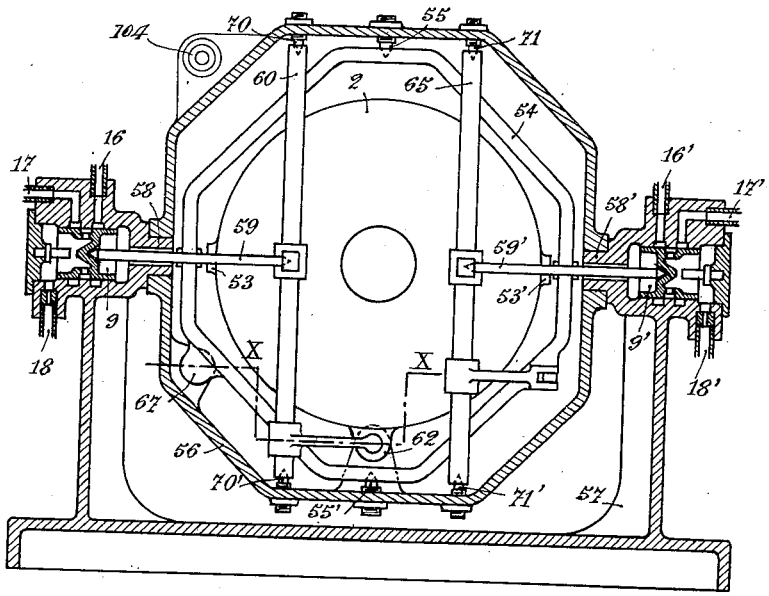
Figure 9:
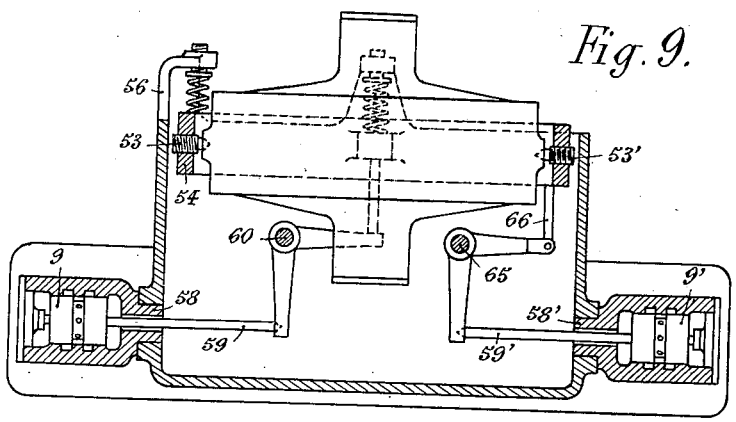

Figures 8 and 9 show in elevation and plan, respectively, a modification employing a double transmitter, the base and suspension frame being shown sectioned by planes passing through the axis of the elevating trunnions of the suspension frame.

Figure 10:
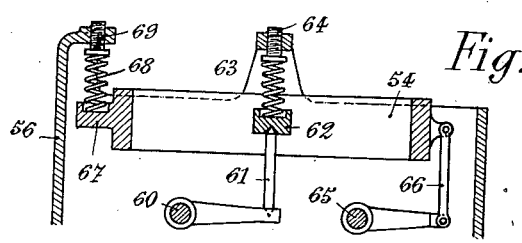

Figure 10 is a partial section along the line X—X in Figure 8.

Figure 11:
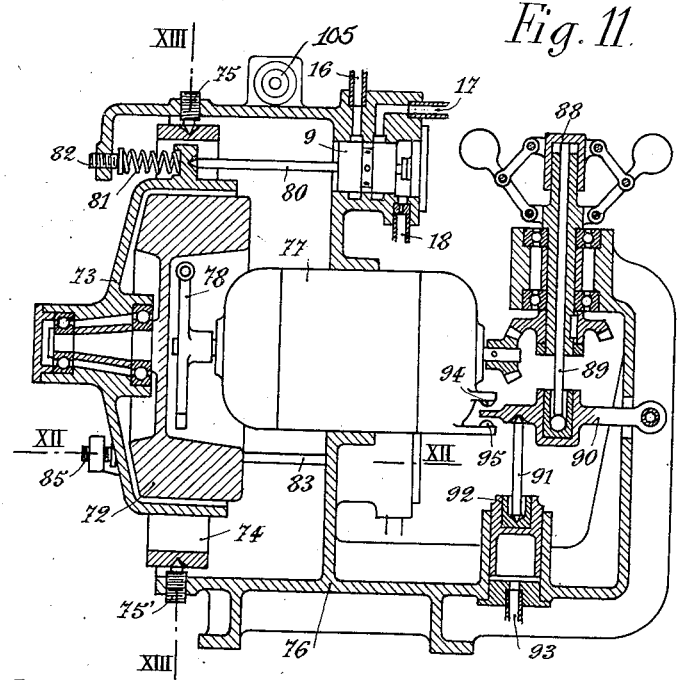

Figure 11 shows in sectional elevation a double transmitter, wherein the rotor is adapted to be subjected to considerable and rapid variations in speed.

Figure 12:
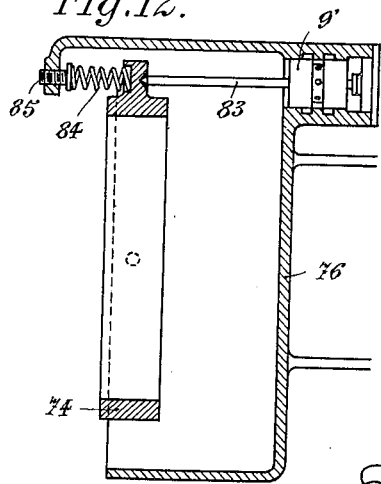

Figure 12 is a partial section along the line XII—XII in Figure 11.

Figure 13:
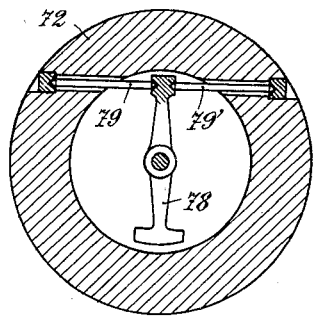

Figure 13 is a partial section along the line XIII—XIII in Figure 11.

Figure 14:
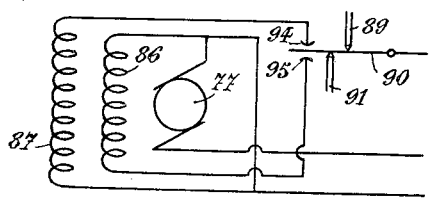

Figure 14 is a diagram of the electrical connections relating to the control of the speed of the rotor shown in Figure 11.

The device shown in Figures 1 to 7 comprises a gyroscope constituted in known manner by a rotor 1 revolving in a casing 2 suspended from a frame 3 by trunnions 4 and 4' along a horizontal axis perpendicular to the axis of the rotor. The frame 3 is operatively connected in any suitable manner to a target observing telescope so as to move therewith in azimuth about a vertical axis perpendicular to both the axis of trunnions 4, 4' and the axis of rotor 1. For example, a telescope 96 may be mounted on the frame 3 in the manner indicated in Figures 1 and 4 so as to move with the frame in azimuth but relatively thereto in elevation. A boss 5, integral with the casing 2, receives on one side thereof the pressure of a spring 6 which bears by its other end against an adjustable seat 7 carried by the frame 3. A push rod 8 engages the other side of the boss 5 and operatively connects the same to a piston pressure-reducing device 9 moving in a cylindrical housing provided in the frame 3 and closed by an end 10 which carries a stop 11. A circular groove 12 provided in the piston 9 is put into communication by means of a certain number of orifices 13 with the chamber closed by the base 10 and called the expansion chamber of the transmitter. The wall of the cylindrical housing includes two circular grooves 14 and 15 separated from one another by a partition of a thickness substantially equal to the width of the groove 12 in the piston. The said grooves 14 and 15 are in communication respectively with the pipe lines 16 and 17. Furthermore, a pipe line 18 including a throttling diaphragm 19 puts the expansion chamber into communication with another chamber called the manometric chamber provided in a frame 20 forming the casing of the receiver and bounded by a fixed end 21 and also by a pilot piston 22 and a control sleeve 23. The said sleeve is secured to a driving rod 24 and a driving or motor piston 25 by means of a driving finger 26 while the driving rod 24 is operatively connected in any suitable manner with the member whose position is to be corrected to compensate for the probable change of position of the target during the time of flight of the projectile as indicated by the angular velocity of the target observing telescope. For example, the rod 24 may be connected to a rack member 97 with which is engaged a pinion 98 mounted on a shaft 99 constituting the input to one side of a differential gear arrangement 100. The shaft 101 constituting the input to the other side of the differential may be actuated in any suitable manner to indicate the bearing of the target. The output gear 102 of the differential may then be drivingly connected to the pointer of a suitable indicator 103 in known manner, whereby said pointer indicates the bearing of the target corrected to compensate for its probable change of position during the time of flight of the projectile. The pilot piston 22 includes two circular grooves 27 and 28 in correspondence with the intermediate portions separating three circular grooves 29, 30, and 31 provided in the sleeve 23. The grooves 29 and 31 communicate respectively with longitudinal grooves 32 and 33 (Figures 2 and 3), which in their turn communicate respectively through orifices 34 and 35 with a discharge chamber 36 provided in the casing 20 and closed by a cover 37. The piston 25 moves in a cylinder, the two working chambers 38 and 39 of which are put into communication respectively, through the medium of the pipe lines 40 and 41, the grooves 42 and 43 and the orifices 45 and 44, with the grooves 27 and 28, respectively of the pilot piston 22. The latter is connected by means of a push rod 46 to a swing-bar 47 connected to the frame 20 by two springs 48 and 49. An oil pump 50 draws oil from the chamber 36 through a pipe line 51 and delivers it into the pipe line 17. The chamber 36 is furthermore in free communication with the pipe line 16. Finally, in the pipe line 18 is disposed a manometer 52 having its graduated scale symmetrical with respect to the zero which corresponds substantially to the mean position of the pointer on the dial.

In the transmitting device shown in Figures 8, 9, 10, the casing 2 of the gyroscope is suspended by horizontal trunnions 53 and 53' from a frame 54, which in turn is suspended by vertical trunnions 55 and 55' from an oscillating support 56, which is adapted to be aimed in elevation relatively to a fixed frame 57 as well as trained in azimuth with said frame to follow the movements of the target observing telescope 104 which in this instance may be carried by said support. For this purpose the frame 57 is provided with horizontal trunnions 58 and 58' on which the support 56 is rotatably mounted. The frame 57 also includes cylindrical housings, the axis of which coincides with the axis of the elevating trunnions 58 and 58' and in which move pressure-reducing pistons 9 and 9' identical with the pressure-reducing piston of the device previously described. The piston 9 is connected to the casing 2 by means of a push rod 59, an intermediate shaft 60, a push rod 61 and a boss 62 secured to the casing 2. The said boss receives the pressure of a spring 63 bearing on an adjustable seat 64 secured to the oscillating support 56. The piston 9' is connected to the frame 54 by means of a push rod 59', an intermediate shaft 65 and a connecting rod 66. The frame 54 carries a boss 67 which receives the pressure of a spring 68 bearing on an adjustable seat 69 secured to the oscillating support 56. On the latter are pivoted the shafts 60 and 65 respectively by the pivots 70 and 70' and the pivots 71 and 71'.

In the transmitting device shown in Figures 11, 12, 13, and 14, a rotor 72 is journalled in a casing 73 which in turn is journalled in a frame 74 along a horizontal axis exactly as, in the device shown in Figures 8 and 9, the casing 2 is journalled in the frame 54. The frame 74 is pivoted by means of vertical trunnions 75 and 75' to a frame 76 which carries the target observing telescope 105 and an electric motor 77 coupled to the rotor 72 by means of a balanced lever 78 and push rods 79 and 79' disposed substantially in the plane of the two axes of suspension of the casing 73. The pressure-reducing pistons 9 and 9' identical with the pressure-reducing pistons of the preceding devices, are adapted to move in cylindrical housings provided in the frame 76. The piston 9 is connected by a push rod 80 to the casing 73 which receives the pressure of a spring 81 bearing on an adjustable seat 82 secured to the frame 76. The piston 9' is connected by a push rod 83 to the frame 74 which receives the pressure of a spring 84 bearing on an adjustable seat 85 secured to the frame 76. The motor 77 is of the series type with reversal of the torque and comprising two field windings 86 and 87. It actuates a centrifugal governor which by means of a slide 88 and push rod 89 acts upon a contact lever 90 pivoted to the frame 76. The lever 90 also receives the antagonistic action of a push rod 91 actuated by a piston 92 moving in a cylindrical housing of the frame 76 and receiving the controlled pressure of a fluid through a pipe line 93. The pressure of the fluid in pipe line 93 may be varied in any suitable manner as a function of some other factor entering into the fire control, such as the range of the objective or target. Suitably insulated to serve as an electrical conductor, the lever 90 is adapted to oscillate between two contacts 94 and 95 which allow the currents to pass into the field windings 87 and 86, respectively.

In systems utilizing transmitters of the forms shown in Figures 8-10 and 11-14, whereby corrections in both azimuth and elevation may be derived from a single gyroscope suspended in a frame having two degrees of freedom, there are also provided twin receivers identical with that shown in Figures 1-7, the movable or motor elements of said receivers being operatively connected in any suitable manner to the members controlling the laying of the gun in azimuth and elevation, respectively.

The various devices described hereinbefore operate as follows:—

The pressure-reducing piston 9, or pistons 9 and 9', ensure the distribution of the fluid forced by the pump 50 through the pipe line 17 under a predetermined pressure. A lower pressure is established in the expansion chamber, automatically equilibrating the action of the push rod 10 acting directly on the said pressure-reducing piston. By means of the pipe line 18, the pressure established in the expansion chamber is transmited to the manometric chamber and produces a thrust on the pilot piston 22, which always finds a position of equilibrium for a certain flexion of the springs 48 and 49.

The pipe line 16 serves to discharge the fluid from the expansion chamber, when, due to a drop in pressure, the volume of the manometer chamber diminishes and a portion of the liquid contained in the latter is forced through the pipe line 18 towards the said expansion chamber.

The result of this is that the movement of the pilot piston 22 relatively to the frame 20 is proportional to the thrust transmitted by the push rod of the pressure-reducing piston 9 or 9', and that, by means of the sleeve 23, the control rod 24 is itself moved proportionally to the said thrust, irrespective of the resistance offered by the member to be operated.

In the device shown in Figures 1 to 7, the push rod 8 transmits the resultant of the pressure of the spring 6 and the tangential force produced by the reaction offered by the rotor 1 of the gyroscope (the velocity of which is assumed to be constant) to the movements in azimuth impressed upon the observation telescope which is operatively connected to the suspension frame 3. As is known, the said reaction is proportional to the angular velocity ω of the frame 3 about an axis perpendicular to the plane formed by the axis of the rotor and the line of the trunnions 4—4'. When the said velocity ω is zero, the push rod 8 is only subject on the one hand to the constant calibration pressure of the spring 6, and on the other hand to the pressure in the pipe line 18, which then has a well-determined value, for which the pointer of the manometer is at the zero of the scale, while the driving piston 25 is at the zero correction position corresponding to a likewise predetermined flexion of the springs 48 and 49. When the gyroscopic reaction is not zero, the tangential force on the push rod 8 is added algebraically to the tension of the spring 6. This results in a movement of the pistons 22 and 25 relatively to their normal or zero correction position, the said movement being proportional to the angular velocity ω and being in the same sense as the said velocity.

In the device of Figures 1-7, the operation of which has just been described, the gyroscope is suspended from the support 3 along one axis only, defined by the line of the trunnions 4 and 4', which in a manner connect the casing 2 and the said support 3 in the movement of angular velocity ω, but which, however, allow the piston 9 to move freely for playing its part as distributor with all the necessary sensitivity.

In the devices shown in Figures 8, 9, 10, 11 and 12, the gyroscope is suspended from the support 56 or 76 by means of a frame, that is to say along two axes of pivoting. It can no longer be considered as being positively connected to the said support for an angular movement produced about an axis perpendicular to the axis of the rotor. Actually, however, the liquid of the pressure-reducing chambers forming a check on the pistons 9 and 9' ensures a sufficient connection to drive the casing in the angular movements of the support, while being sufficiently flexible to permit of the relative movements of very small amplitudes normally imposed by the operation of the pressure-reducing devices.

It should be noted furthermore that the incompressibility and the viscosity of the liquid oppose the establishment of any resonance between these small relative movements which consequently cannot in any case be developed and give rise to nutations, that is to say irregular movements of the gyroscope. It is therefore possible according to the invention to construct a double transmitter while employing a single rotor, each of the two pressure-reducing devices being in communication with a receiver similar to that which has been described hereinbefore.

When a transmitter is constructed to permit of elevation of the support frame (Figures 8 and 9), it is advantageous to place the pressure-reducing devices on the fixed frame in order to obviate the use of flexible pipe lines. In that case, the special rod gear described hereinbefore is employed for the transmission of the mechanical thrusts on the pressure-reducing pistons 9 and 9'. The push rods 59 and 59' being disposed along the geometric axis of the trunnions 58 and 58', any untimely action on the said pistons during the elevation of the movable support 56 is obviated.

In the device shown in Figures 11, 12, 13, and 14, means are employed for varying the speed of the rotor 72 as rapidly as is necessary without producing on the suspended system any reactions capable of being combined with the gyroscopic reaction proper, and consequently capable of introducing inadmissible disturbances in the operation of the pressure-reducing devices. It is certain, on the one hand, that the coupling constituted by the lever 78 and the push rods 79 and 79' cannot in practice either create or transmit any untimely action on the said suspended system. It is equally certain, on the other hand, that being rigidly fixed to the frame 76, the motor 77 may, without inconvenience and by simple means, be given an external mechanical action for modifying its feed. Thus, the push rods 89 and 91 acting in opposition on the contact lever 90 may be actuated with all the necessary force. If the distribution by the said lever affects the total feed current, in accordance with the diagram shown in Figure 14, there is obtained a very high torque in one sense or the other, capable of imparting to the rotor at any instant a predetermined speed depending upon the distance of the objective.

By creating a loss of head in the pipe line 18, the diaphragm 19 constitutes a very simple means of reducing the amplitude of the oscillations of the pilot piston 22 and all the more of the oscillations of the driving piston 25 which correspond to the irregularities of the angular velocity $\omega$, generally due to the unavoidable irregularities of the aiming velocity. By the effect of the said diaphragm, the volume of the manometric chamber can only vary slowly. The result thereof is practically that the correcting device, instead of being influenced immediately at any instant by the changes in position more or less regularly impressed upon the telescope, remains sensitive only to the mean angular velocity of the support of the gyroscope, that is to say, to the only velocity which is to be considered for the determination of the corrections.

In all the forms of constructions which have just been described, the pressure controlled by the transmitter or transmitters determines the position of the receiving pilot member and hence the position of the member of the servo-motor effecting the desired correction. This pressure is transmitted by a pipe line, the delivery of which is low enough for the loss in head therein to be negligible. This pipe line therefore provides between the transmitter and the receiver, which may be some distance apart, a transmission of sufficient precision and of convenient installation.

Furthermore, if a liquid is employed, that is to say, a fluid of very low compressibility (water, oil and the like) to reduce to a minimum the effects of elasticity in the conduit, it is possible, as stated hereinbefore, to employ a single gyroscope for determining the corrections in two perpendicular planes (training correction and elevation correction). The transmission liquid acting on the pistons of the two pressure-reducing devices constitutes a check, sufficient to prevent the initiation or at least the excessive development of nutation movements, but nevertheless ensuring the necessary and adequate angular connections between the gyroscope and its suspension frame.

Among the means covered by the present invention, provision is also made for varying the speed of the rotor in order to obtain corrections proportional not only to a certain component $\omega$ of the angular velocity of the suspension frame, but to the product of the said component multiplied by another variable factor, such as the duration $t$ of flight of a projectile or a certain function of the said duration.

An important advantage of the invention described is also to be seen in the fact that use is made of a motor of sufficient power fixed to the suspension frame of the gyroscope and not, as is usual, to the actual casing of the rotor for imposing on the latter the said variation in velocity with all the necessary rapidity. The rotor and the shaft of the motor being connected by a special coupling lend themselves freely to the throwing out of centre of the one relatively to the other. Due to such an arrangement, it is possible, as set forth hereinbefore, to act by convenient means on the speed governor of the motor without creating any disturbance in the operation of the transmitter.

It will be appreciated that, without any prejudice to the exact and continuous transmission of the tachymetric corrections, it is possible to employ the devices described for causing them to transmit other or additional corrections, such as corrections for wind, drift and so forth. One means may consist, for example, in an appropriate action on the calibration spring 6, the support of which on the frame 3 may for this purpose be rendered movable according to a predetermined law.

While three different forms of the invention have been described and illustrated in the accompanying drawings, it will be obvious that the invention is not limited to the exact structure shown but is capable of a variety of mechanical embodiments. Various changes, which will now suggest themselves to those skilled in the art, may be made in the form, details of construction and arrangement of the parts without departing from the spirit of the invention. Reference is therefore to be had to the appended claims for a definition of the limits of the invention.

I claim:

1. A tachymetric correcting device for use in gunnery fire control systems in combination with a target observing telescope and an element of the gun laying mechanism whose position is to be corrected to compensate for the probable change of position of the target during the time of flight of the projectile, comprising a suspension frame operatively connected with the observing telescope to move therewith at least in azimuth, a gyroscope having its casing pivotally mounted in said suspension frame on an axis at right angles to the axis of rotation of the gyroscope rotor, a fluid operated servo-motor device operatively connected to the element whose position is to be corrected, means controlling the supply of fluid to said servo-motor device including a movable member subjected on one side to the pressure of the fluid supplied to said controlling means, and means for transmitting to the other side of said member the thrust exerted by said gyroscope casing in attempting to precess about its pivotal axis in said suspension frame upon movement of said frame in azimuth.

2. A tachymetric correcting device for use in gunnery fire control systems in combination with a target observing telescope and an element of the gun laying mechanism whose position is to be corrected to compensate for the probable change of position of the target during the time of flight of the projectile, comprising a suspension frame operatively connected with the observing telescope to move therewith at least in azimuth, a gyroscope having its casing pivotally mounted in said suspension frame on an axis at right angles to the axis of rotation of the gyroscope rotor, a fluid operated servo-motor device operatively connected to the element whose position is to be corrected, means controlling the supply of fluid to said servo-motor device including a movable member subjected on one side to the pressure of the fluid supplied to said controlling means, means for transmitting to the other side of said member the thrust exerted by said gyroscope casing in attempting to precess about its pivotal axis in said suspension frame upon movement of said frame in azimuth, and adjustable means for modifying the thrust thus created by said attempted precession of the gyroscope.

3. A tachymetric correcting device for use in gunnery fire control systems in combination with a target observing telescope and an element of the gun laying mechanism whose position is to be corrected to compensate for the probable change of position of the target during the time of flight of the projectile, comprising a suspension frame operatively connected with the observing telescope to move therewith at least in azimuth, a gyroscope having its casing pivotally mounted in said suspension frame on an axis at right angles to the axis of rotation of the gyroscope rotor, a fluid operated servo-motor device operatively connected to the element whose position is to be corrected, means controlling the supply of fluid to said servo-motor device including a movable member subjected on one side to the pressure of the fluid supplied to said controlling means, means for transmitting to the other side of said member the thrust exerted by said gyroscope casing in attempting to precess about its pivotal axis in said suspension frame upon movement of said frame in azimuth, a compression spring positioned between said suspension frame and said gyroscope casing for modifying the thrust thus created by said attempted precession of the gyroscope, and means for adjusting the pressure of said spring.

4. A tachymetric correcting device for use in gunnery fire control systems in combination with a target observing telescope and an element of each of the training and elevating gun laying mechanisms whose position is to be corrected to compensate for the probable change of position of the target during the time of flight of the projectile, comprising a suspension frame operatively connected with the observing telescope to move therewith in both azimuth and elevation, a gyroscope mounted in said suspension frame for movement about two axes at right angles to one another and to the axis of rotation of the gyroscope rotor, a pair of fluid operated servo-motor devices operatively connected to the elements whose positions are to be corrected, means controlling the supply of fluid to one of said servo-motor devices including a movable member subjected on one side to the pressure of the fluid supplied to said controlling means, means for transmitting to the other side of said member the thrust exerted by the gyroscope in attempting to precess about one of its axes of freedom upon movement of said suspension frame in azimuth, separate means for controlling the supply of fluid to the other of said servo-motor devices including a second movable member subjected on one side to the pressure of the fluid supplied to its associated controlling means, and means for transmitting to the other side of said second movable member the thrust exerted by the gyroscope in attempting to precess about its other axis of freedom upon movement of said suspension frame in elevation.

5. A tachymetric correcting device for use in gunnery fire control systems in combination with a target observing telescope and an element of each of the training and elevating gun laying mechanisms whose position is to be corrected to compensate for the probable change of position of the target during the time of flight of the projectile, comprising a suspension frame operatively connected with the observing telescope to move therewith in both azimuth and elevation, a gyroscope mounted in said suspension frame for movement about two axes at right angles to one another and to the axis of rotation of the gyroscope rotor, a pair of fluid operated servo-motor devices operatively connected to the elements whose positions are to be corrected, means controlling the supply of fluid to one of said servo-motor devices including a movable member subjected on one side to the pressure of the fluid supplied to said controlling means, means for transmitting to the other side of said member the thrust exerted by the gyroscope in attempting to precess about one of its axes of freedom upon movement of said suspension frame in azimuth, separate means for controlling the supply of fluid to the other of said servo-motor devices including a second movable member subjected on one side to the pressure of the fluid supplied to its associated controlling means, means for transmitting to the other side of said second movable member the thrust exerted by the gyroscope in attempting to precess about its other axis of freedom upon movement of said suspension frame in elevation, and springs operatively interposed between said suspension frame and those points of said gyroscope mounting at which the said thrusts due to precession are exerted on said transmitting means.

6. A tachymetric correcting device according to claim 4 including a supporting member on which said suspension frame is pivotally mounted on a horizontal axis laterally off-set from the horizontal axis of freedom of the gyroscope, said two controlling means also being mounted on said supporting member, and wherein each of said thrust transmitting means includes a rod substantially coaxial with said horizontal axis on which the suspension frame is pivotally mounted.

7. A tachymetric correcting device according to claim 4 including a supporting member having a pair of horizontal trunnions laterally off-set from the horizontal axis of freedom of said gyroscope and forming a pivotal mounting for said suspension frame, housings carried by said supporting member coaxial with said trunnions in which the movable members of said two controlling means are housed, and a pair of rods coaxial with said trunnions constituting portions of said two thrust transmitting means.

8. A tachymetric correcting device according to claim 1 including a motor for driving the rotor of said gyroscope fixed with respect to said suspension frame, and a flexible coupling between said motor and rotor so constructed and arranged that the rotor may move out of axial alignment with the motor shaft without adversely affecting the driving connection therebetween.

9. A tachymetric correcting device according to claim 1 including a governor device for automatically controlling the speed of rotation of the gyroscope rotor, and means for modifying the controlling effect of said governor device in accordance with variations in the range of the target.

10. A tachymetric correcting device according to claim 1 including a governor device for automatically controlling the speed of rotation of the gyroscope rotor, and means for opposing the action of said governor device by a force which varies as a function of the range of the target.

11. A tachymetric device according to claim 1 including a motor of the series type having a pair of field windings for driving the gyroscope rotor, a pair of contacts each connected to one of said field windings, a switch arm extending between and movable into contact with either of said contacts, a governor device operable by said motor and so connected to said switch arm as to urge it toward one of said contacts with a force which varies as a function of the speed of said motor, and means for urging said switch arm toward the other of said contacts with a force which varies as a function of the range of the target.

12. A tachymetric correcting device according to claim 1 wherein said fluid operated servo-motor device includes a pilot cylinder, a distribution sleeve slidable within said pilot cylinder, a pilot piston freely slidable within said distribution sleeve, means for supplying a fluid under pressure to said pilot cylinder to act on one side of said pilot piston, adjustable means exerting an equilibrating force on the other side of said pilot piston, a motor piston operatively connected to the element whose position is to be corrected, a cylinder for said motor piston, means including passageways in said pilot piston and distribution sleeve for supplying a fluid under pressure to one or the other of the sides of said motor piston dependent upon the positions of said pilot piston and distribution sleeve, and means connecting said distribution sleeve to said motor piston for movement therewith.

13. In a tachymetric correcting device for use in gunnery fire control systems of the type wherein the position of an element of the gun laying mechanism is corrected in accordance with the angular velocity of the target observing telescope to compensate for the probable change of position of the target during the time of flight of the projectile, a fluid operated servo-motor device for effecting the correcting movement of said element including a pilot cylinder, a distribution sleeve slidable within said pilot cylinder, a pilot piston freely slidable within said distribution sleeve, means for supplying a fluid under pressure to said pilot cylinder to act on one side of said pilot piston, adjustable means exerting an equilibrating force on the other side of said pilot piston, a motor piston operatively connected to the element whose position is to be corrected, a cylinder for said motor piston, means including passageways in said pilot piston and distribution sleeve for supplying a fluid under pressure to one or the other of the sides of said motor piston dependent upon the positions of said pilot piston and distribution sleeve, and means connecting said distribution sleeve to said motor piston for movement therewith, and means for varying the pressure of the fluid supplied to said servo-motor device in accordance with variations in the angular velocity of the target observing telescope.

14. In a tachymetric correcting device for use in gunnery fire control systems of the type wherein the position of an element of the gun laying mechanism is corrected in accordance with the angular velocity of the target observing telescope to compensate for the probable change of position of the target during the time of flight of the projectile, the combination of a gyroscope so connected with said target observing telescope that the precessional movements thereof are a measure of the angular velocity of said telescope, a fluid operated servo-motor device operatively connected to the element whose position is to be corrected, and means operatively connected with said gyroscope for controlling the pressure of the fluid supplied to said servo-motor device, said means being so constructed and arranged that the pressure of the fluid supplied to said servo-motor device varies as a function of the precessional movements of said gyroscope.

JEAN FIEUX.